Patented May 9, 1939

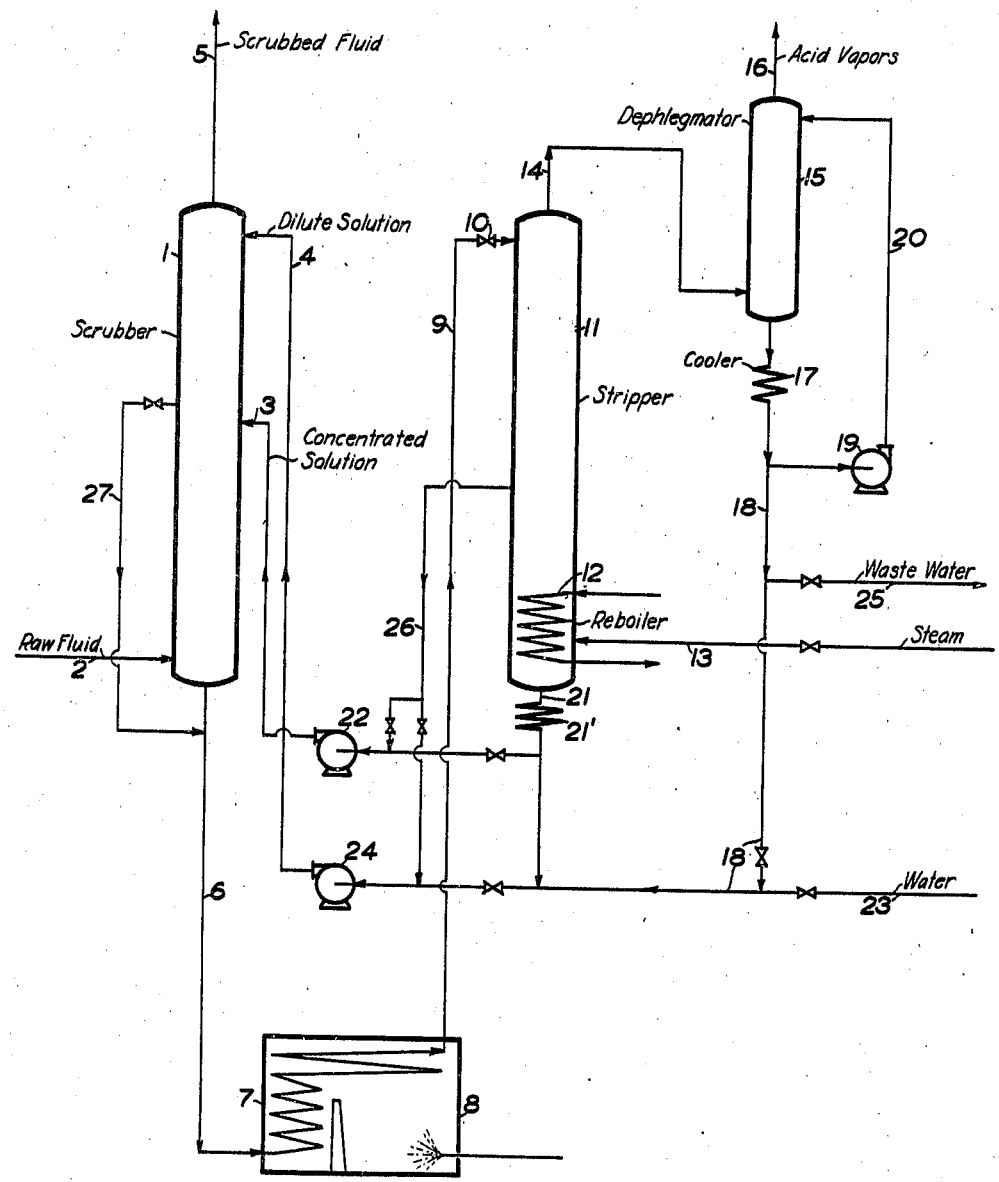

2,157,879

UNITED STATES PATENT OFFICE.

2,157,879

PURIFICATION AND SEPARATION OF GASEOUS MIXTURES

Ernest W. Zublin, San Francisco, Calif., assignor to Shell Development Company, San Francisco, Calif., a corporation of Delaware Application August 14, 1937, Serial No. 159,027

10 Claims. (Cl. 23—3)

This invention relates to the purification of gases and hydrophobe liquids containing vaporizable weakly acidic components such as $H_2S$, $CO_2$, HCN, mercaptans, phenols, etc., and especially deals with the purification of normally gaseous hydrocarbons containing objectionable quantities of $H_2S$.

A number of processes have been proposed and employed for the separation of $H_2S$ and analogous vaporizable weak acids from gases or hydrophobe liquids, which processes involve the continuous circulation of an alkaline reacting liquid absorption medium through an absorption stage in which the fluid is scrubbed and $H_2S$ absorbed in the alkaline liquid, and through a reactivation or stripping stage in which the absorbed $H_2S$ is removed, wherein the absorption medium is regenerated and rendered suitable for further scrubbing.

It is a purpose of this invention to provide a novel method for improving the absorption and regeneration efficiencies. Another purpose is to increase the absorption efficiency so that a high degree of purification of the fluid can be achieved with a minimum expenditure of heat for regeneration.

Fluids treated by processes of the type described comprise natural gas, petroleum refinery gases, coke oven gas, generator gas and other manufactured gases, as well as the gases generated in the various industries such as ore smelting; or air containing weakly acidic gases, especially hydrogen sulfide or $CO_2$; or organic liquids which are substantially immiscible with water as propane, butane, pentane, hexane fractions, benzene, natural gasoline, low boiling gasoline fractions, gasoline distillates, kerosene distillates, normally liquid chlorinated hydrocarbons for instance carbon tetrachloride, ethylene dichloride, etc., fatty and essential oils, and other hydrocarbon and nonhydrocarbon chemically neutral fluids.

For the absorption of the weakly acidic components, aqueous solutions of certain organic hydroxy amino bases or salts of inorganic strong bases and relatively weak acids of low volatility are usually employed. A suitable absorption medium absorbs the weak acid from the fluid quickly and completely and is capable of being regenerated by convection activation, i. e., it permits substantial removal of the acid by simple distillation or by a reversal of the absorption reaction in a simple manner, by passing an inert gas therethrough, preferably at an elevated temperature, as by boiling, steaming, and at a normal or reduced pressure. Among the absorption media capable of regeneration by convections which have been used in the past for removing $H_2S$ and HCN are aqueous solutions of the following compounds: tripotassium phosphate, sodium carbonate, sodium phenolate, sodium borate, sodium arsenite, mono-, di- and tri-ethanol amine or mixtures thereof, diaminoisopropanol, etc. Mercaptans are generally removed with aqueous solutions of alkali metal hydroxides.

When herein speaking of absorbents I mean alkaline compounds of the above type which are capable of absorbing weak acids and releasing them upon heating and/or under reduced pressure in contact with a vaporous convection medium such as steam, air, nitrogen, hydrogen, hydrocarbon vapors, etc. The terms fat, foul or spent solution as herein used designate an absorbent solution which contains sufficient weak organic acid so that the solution must be regenerated before it can be used economically for further scrubbing of fluid; and the term lean solution indicates a regenerated solution suitable for further scrubbing.

It is known that the amount of weak acid which can be absorbed per volume unit of an absorbent solution from a fluid containing same to reduce its acid content to a desired level increases with the concentration of the absorbent in the solution. Therefore, it has been the general practice to employ solutions of suitable absorbents which are as nearly saturated as can be handled safely at the lowest temperatures occurring in the absorption and regeneration systems, without danger of causing operating difficulties such as improper contact between fluid and absorbent solution because of insufficient volume of the latter, or precipitation of a portion of the salt, if the absorbent is a salt, which would lead to clogging of the apparatus.

The data in Table I illustrate the effect of concentration of $K_3PO_4$ on the amount of $H_2S$ which can be absorbed to result in solutions having certain $H_2S$ pressures at 150° F.

TABLE I

| Mols $K_3PO_4$ per kg. solution | Lbs. $H_2S$ absorbed per gallon solution— mm.$H_2S$ equilibrium press. in vap. space | | |
|---|---|---|---|
| | 1 mm. | 5 mm. | 10 mm. |
| 1.485 | .28 | .40 | .45 |
| 1.95 | .37 | .54 | .61 |

From the fact that absorbent solutions of relatively high concentration are capable of absorbing larger quantities of weak acid per volume unit than more dilute solutions, it was concluded that relatively concentrated solutions are better absorbents, capable of reducing the acid content of the fluid to a lower figure, and conversely that the absorbed weak acid from a spent solution is more easily expelled from a relatively dilute solution. In consequence, it is the general practice to give the fluid its final scrubbing with a relatively concentrated absorbent solution.

Now I have discovered that it is more economical to give the fluid its final scrubbing with a relatively dilute solution. Contrary to expectations and former assumptions, the partial pressure of $H_2S$ or similar weak acids increases with a rise in the concentration of the absorbent for constant ratios of the weak acid to absorbent in the solution as long as the absorbent solutions form but a single layer.

The significance of this pressure-concentration relation is that a given amount of absorbent in a relatively dilute solution is capable of reducing the content of the weak acid content of the fluid to a lower figure than the same amount of absorbent in a more concentrated solution, and as I have found, it is immaterial whether the treated fluid as well as the acid are gaseous or liquid, although in general the advantages of the more dilute solution are greatest where the fluid is a gas.

The data in Table II below, which are typical, show the change of $H_2S$ pressure with variations in the concentration of the absorbent $K_3PO_4$ at a constant ratio of absorbent to $H_2S$ in the solution at a temperature of 150° F.

TABLE II

Mol ratio of $H_2S$ to $K_3PO_4 = .85$

| Mols $K_3PO_4$ per kg. solution | Mols $K_3PO_4$ per gal. solution | Lbs. $H_2S$ absorbed per gal. | $H_2S$ equilibrium press. in vapor space mm. Hg. |
|---|---|---|---|
| 1.0 | 4.63 | .296 | 8.7 |
| 1.5 | 7.70 | .491 | 16.6 |
| 2.0 | 11.40 | .728 | 31.6 |
| 2.5 | 15.77 | 1.007 | 60.3 |

Similar relations of $H_2S$ pressures to concentration at constant $H_2S$ to absorbent ratios hold, for instance, for diaminoisopropanol as shown in Table III.

TABLE III

| Mol ratio $H_2S$ to DAP* equivalent | Pressure of $H_2S$ mm. Hg. at 150° F. | |
|---|---|---|
| | 15% DAP* in solution | 30% DAP* in solution |
| .328 | 90 | 124 |
| .197 | 23 | 33 |
| .103 | 5 | 8 |

*DAP=diaminoisopropanol; 1 equivalent=½ mol DAP

As pointed out before, an exception to the above pressure-concentration rule may be found in cases where the absorbent or a portion thereof is precipitated to form a separate phase or layer. Such a condition may be encountered in the case of sodium phenolate. There it has been found that within the region of a single phase the rule applies in accordance with the findings described hereinbefore. But in the region where the spent absorbent solution separates into two or more layers the opposite may be true. The beneficial effect of my invention, as far as efficiency of absorption is concerned, is therefore greatest with absorbent solutions which upon absorption of the weak acid form but a single layer. A partial loss of efficiency in the case of phenolate solutions when they form two layers is, however, counterbalanced by a reduction in the loss of separated phenol caused by vaporization during scrubbing. Since in my method of treating only the final scrubbing of the fluid is carried out with a dilute solution, the amount of weak acid absorbed in this step is usually insufficient to spring the solution, with the result that the partial vapor pressure of the phenol is extremely low, resulting in a negligible loss by vaporization.

My invention consists essentially of scrubbing a fluid containing a vaporizable weak acid with at least two aqueous solutions of the same absorbent having successively lower concentrations. The scrubbing is preferably carried out in countercurrent and the different solutions are advantageously combined as they flow through the scrubbing zone to form a single fat solution which is then regenerated in a stripping zone by convection methods. Before, during or after the regeneration the absorbent solution is concentrated by vaporizing part of the water of solution. The concentrated regenerated solution is then divided into two or more portions and the condensed water or an equal amount of fresh water is added to one or more of the portions to produce solutions of different concentrations.

Normally we prefer to divide the regenerated absorbent solution into two unequal portions and to add the condensed water of vaporization to the smaller portion only. The resulting dilute portion is then used to give the fluid its final scrubbing and the partly spent solution from the scrubbing is then preferably combined with the bulk of the undiluted regenerated solution for the scrubbing of raw fluid. The ratio of the two portions may vary within wide limits, suitable ratios ranging from 1:1 to 1:40, but are normally between the limits of 1:5 to 1:30 for best results.

The concentration of absorbent in the solution after combining the several streams may vary within wide limits depending upon various operating conditions as well as the type of absorbent used. Normally it is good practice to employ a concentration of absorbent for the combined stream approximately equal to that which would give the best results in the single stream operation under a particular set of conditions. The concentration of the diluted and undiluted portions will then depend upon the amount of water vaporized and condensed, and the ratio of the two portions. The amount of water vaporized is controlled by the desired thoroughness of the stripping operation, which in turn depends on the maximum permissible amount of residual weak acid in the scrubbed fluid.

Considering this string of interdependent conditions it is evident that the optimum concentration of the dilute portion may also vary within wide limits. Thus when removing the $H_2S$ with a suitable absorbent I have successfully employed dilute solutions containing between .1 to 1.5 mols of the absorbent per kg. solution. Ordinarily, however, the concentrations of the dilute portion are between .2 to 1.0 mol per kg. solution. In the case of mercaptan removal with alkali metal hydroxide, the dilute solution may contain as much as 2.0 mols per kg.

If the absorbent solution forms a single layer upon absorption of the weak acid, concentration of the spent solution is preferably carried out before or during the reactivation, since in accordance with the principle hereinbefore expounded, this will result in a material saving of steam required to effect a certain degree of regeneration.

The principle of my invention can be incorporated into many forms and modifications of treating systems. The attached drawing represents a flow diagram of a typical scrubbing and stripping arrangement in which my multiple stream system of scrubbing applicable to the removal of a normally gaseous acid is demonstrated and fat absorbent solution is concentrated before and during regeneration.

Referring to the drawing, a raw fluid of the type hereinbefore described containing an acidic gas such as $H_2S$ enters a conventional scrubber 1, which may be a packed or bubble-plate column, through line 2 from a source not shown. The fluid travels in an upward direction through the scrubber in countercurrent to two absorbent solutions, such as aqueous solutions of $K_3PO_4$ or equivalent absorbent, one relatively concentrated and the other diluted, which are introduced through lines 3 and 4 at points of the scrubber 1 intermediate between top and bottom and near the top, respectively. Scrubbed fluid is withdrawn through top line 5 and fat absorbent solution containing acid gas flows through line 6 to heater 7 in furnace 8. Normally, the pressure in the scrubber is sufficient for the solution to flow to stripper 11 without being pumped. Heater 7 instead of being fired directly, may be heated indirectly with steam or by any other suitable means.

The heated solution travels through line 9 and is released through valve 10 into the top of stripper 11 which may be a packed or bubble column or one or a series of shell stills. A portion of the water of solution together with the major portion of the absorbed weak acid is flashed off at once, and as the solution flows downward through the stripper it may be further concentrated and regenerated by heat from the reboiler 12 in the lower part of the stripper. Live steam or other suitable stripping gas or vapor may be introduced through line 13.

Water vapors, acid gas and possibly other vapors, are removed from the stripper 11 through vapor line 14 and pass to reflux condenser 15 where the acid is separated from the remaining vapors, acid gas leaving the condenser through line 16, and condensate, normally consisting essentially of water, passes through cooler 17 in line 18. A portion of the condensate is returned to the top of the dephlegmator 15 by pump 19 in line 20.

Regenerated absorbent solution is withdrawn from stripper 11 through cooler 21' in line 21, and is split into two portions, a large portion, which is picked up by pump 22 in line 3 and introduced into the scrubber 1 at an intermediate point between its top and bottom, and a smaller portion, which is diluted with condensate water from line 18 or an equal amount of fresh water from line 23 to produce a diluted solution and which is then conveyed by pump 24 in line 4 to the top of the scrubber 1.

If fresh water is used for dilution, the condensate water is discarded through line 25.

If desired a portion of regenerated solution may be taken from an intermediate point of the stripper as a side stream through line 26, and may be introduced into lines 3 or 4 on the suction side of pumps 22 or 24, respectively.

Instead of allowing the dilute portion of absorbent solution descending through the upper part of the scrubber to join the concentrated portion in the lower part, the former may be withdrawn as a side stream through line 27 and may be joined with the latter in line 6.

It has been found that the multiple stream method of scrubbing hereinbefore described is so efficient that in many cases the rather expensive plate stripper can be replaced by relatively inexpensive boilers. Among other advantages of boilers over plate strippers in this process are that the former are less troublesome and more certain in their operation. Stripping often becomes unsatisfactory because changes in the surface tension of the solution due to accumulation of impurities, foreign matter clogging the plates, etc., may prevent proper contact of the stripping steam with the solution, thereby greatly reducing the efficiency of the individual contact plates.

While in a simple boiling operation the acid gas content of the solution cannot always be lowered as far as by countercurrent stripping with open steam, the added efficiency of the multiple stream scrubbing as hereinbefore described permits successful removal of the acid gas from the fluid in spite of the higher content of the gas in the absorption medium, without having to resort to excessive circulation rates of the medium.

While in the foregoing I have described one flow diagram, it shall be understood that additional heat exchangers, coolers, valves, by-pass lines, and other equipment may be interposed at one or several points so as to enable the exercise of greater heat economy and the control of the most favorable temperatures. The installation of such devices is considered to be within the skill of the ordinary plant designers acquainted with their operation. Also if the weak acid to be removed is relatively high boiling, or boils over a considerable range as in the case of a mixture of mercaptans, separation of the acid from vaporized water may have to be carried out by settling or other suitable means.

The advantages which result from the multiple stream operation are well illustrated in the following example, results of which are tabulated in Table IV.

A raw hydrocarbon gas containing 2.0% $H_2S$ was scrubbed in counter-current at 150° F. under 10 atm. pressure with a tripotassium phosphate solution under conditions to produce an exit gas containing .04% $H_2S$.

Single and multiple stream scrubbing were compared for different stripping methods, viz.: flash distillation without reflux; stripping in a 15 plate stripper without reflux, distillation taking place on the lowest plate; and batch distillation without reflux.

In the multiple stream operation the ratio of the two portions to be diluted and remaining undiluted, respectively, was 1:9. The undiluted stream which had a concentration of 2.0 mols $K_3PO_4$ per kg. solution, was introduced into the scrubber at a point about half way between the top and bottom while the diluted stream whose concentration varied with the amount of condensate water available from the distillation, was admitted to the top of the scrubber, and the resulting combined stream containing about 1.9 mols $K_3PO_4$ per kg. solution was withdrawn at the bottom of the scrubber.

The scrubbing solution of the single stream operation also contained 1.9 mols $K_3PO_4$ per kg. solution.

The amounts of steam consumed per pound $H_2S$ removed from the gas were as follows:

TABLE IV

| Type of stripping | Stripping by flash distillation | | Stripping in 15 plate scrubber | | Stripping by batch distillation | |
|---|---|---|---|---|---|---|
| | Single | Multiple | Single | Multiple | Single | Multiple |
| Type of scrubbing mols $K_3PO_4$/kg | 1.9 | 1.02 | 1.9 | 1.226 | 1.9 | 1.226 |
| To top of scrubber | | | | | | |
| To middle of scrubber | | 2.0 | | 2.0 | | 2.0 |
| Lbs. of steam per lb. of $H_2S$ | 17.15 | 8.27 | 7.73 | 4.29 | 7.73 | 4.35 |

As will be noted my method of multiple stream operation approximately reduces the amount of steam required to one-half of the single stream operation.

I claim as my invention:

1. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, separating the fluid from the fat solution, regenerating the latter by contact with a stripping medium to drive off absorbed impurities and recirculating the regenerated solution containing residual acidic impurities for further scrubbing the fluid, the improvement comprising dividing the regenerated solution into at least two portions, diluting at least one of the said portions with water to produce solutions of different concentrations of absorbent, resulting dilute solutions having ratios of acidic impurities to absorbent not substantially greater than those of the more concentrated solutions and scrubbing said fluid with said solutions in the order of increasing dilution.

2. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, separating the fluid from the fat solution, regenerating the latter to drive off absorbed impurities and recirculating the regenerated solution containing residual acidic impurities for further scrubbing the fluid, the improvement comprising dividing the regenerated solution into at least two portions, diluting at least one of said portions with water to produce solutions of different concentrations of absorbent, resulting dilute solutions having ratios of acidic impurities to absorbent not substantially greater than those of the more concentrated solutions, flowing said fluid through a scrubbing zone, introducing said portions into said scrubbing zone at various points along the path of said fluid in the order of increasing dilution, and flowing said portions in countercurrent to said fluid.

3. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, separating the fluid from the fat solution, regenerating the latter by contact with a stripping medium to drive off absorbed impurities and recirculating the regenerated solution containing residual acidic impurities for further scrubbing the fluid, the improvement comprising dividing the regenerated solution into at least two portions, diluting at least one of said portions with water to produce solutions of different concentrations of absorbent, resulting dilute solutions having ratios of acidic impurities to absorbent not substantially greater than those of the more concentrated solutions, flowing said fluid through a scrubbing zone, introducing said portions into said scrubbing zone at various points along the path of said fluid in the order of increasing dilution, flowing said portions in countercurrent to said fluid and combining them to form a continuous stream of increasing concentration along its path through said zone.

4. In the process of purifying a fluid from $H_2S$ and analogous acidic impurities which comprises scrubbing the flowing fluid with an aqueous solution of an alkaline absorbent for the acidic impurities capable of convection activation by contact with a stripping medium, to produce a fat solution containing impurities, separating the fluid from the fat solution, regenerating the latter by contact with a stripping medium to drive off absorbed impurities and recirculating the regenerating solution containing residual acidic impurities for further scrubbing the fluid, the improvement comprising regenerating the said fat solution under conditions to concentrate same and to vaporize a part of the water of solution after completed regeneration, dividing the regenerated solution into two unequal portions, combining the smaller portion with an amount of water not greater than the vaporized part to form a portion which is more dilute and has a ratio of acidic impurities to absorbent not substantially greater than the remaining portion, flowing said fluid through a scrubbing zone, introducing the concentrated portion into said zone at an intermediate point and the diluted portion at a point near the end of the path of the fluid through said zone, flowing both portions in countercurrent to the fluid through the zone and combining the portions to form a single fat solution.

5. The process of claim 4 in which the ratio of the two portions is between the limits 1:1 to 1:40.

6. In the process of purifying a fluid from $H_2S$ and analogous acidic impurities which comprises scrubbing the flowing fluid with an aqueous solution of $K_3PO_4$, to produce a fat solution containing impurities, separating the fluid from the fat solution, regenerating the latter by contact with a stripping medium to drive off absorbed impurities and recirculating the regenerated solution containing residual acidic impurities for further scrubbing the fluid, the improvement comprising successively scrubbing said fluid with two separate aqueous solutions of tripotassium phosphate having progressively lower concentrations of the phosphate, each solution having an initial ratio of acidic impurities to phosphate not substantially higher than that of the preceding solution, the concentration of the more concentrated solution being below its saturation under conditions of the process and the more dilute solution having a concentration between .1 to 1.5 mols. $K_3PO_4$ per kg. solution.

7. In the process of purifying a fluid from $H_2S$ and analogous acidic impurities which comprises scrubbing the flowing fluid with an aqueous solution of diaminoisopropanol, to produce a fat solution containing impurities, separating the fluid from the fat solution, regenerating the latter by contact with a stripping medium to drive off absorbed impurities and recirculating the regenerated solution containing residual acidic impurities for further scrubbing the fluid, the improvement comprising successively scrubbing said fluid with two separate aqueous solutions of diaminoisopropanol having progressively lower concentrations of diamino isopropanol, each solution having a ratio of acidic impurities to diamino isopropanol not substantially greater than that of the preceding solution, the more dilute solution containing between .1 to 1.5 mols diaminopropanol per kg. solution.

8. In the process of purifying a fluid from $H_2S$ and analogous acidic impurities which comprises scrubbing the flowing fluid with an aqueous solution of sodium phenolate, to produce a fat solution containing impurities, separating the fluid from the fat solution, regenerating the latter by contact with a stripping medium to drive off absorbed impurities and recirculating the regenerated solution containing residual acidic impurities for further scrubbing the fluid, the improvement comprising dividing a regenerated aqueous solution of sodium phenolate into two unequal portions, diluting the smaller portion with an amount of water to produce a diluted portion having a lower concentration of phenolate and a ratio of acidic impurities to phenolate not greater than the larger portion, scrubbing said fluid with the combined diluted and undiluted portions, under conditions substantially to remove the impurities, and further scrubbing the resulting fluid with the diluted portion only, the amount of water of dilution being sufficient to prevent separation of the diluted portion into two liquid layers.

9. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, separating the fluid from the fat solution, regenerating the latter by contact with a stripping medium to drive off absorbed impurities and recirculating the regenerated solution containing residual acidic impurities for further scrubbing the fluid, the improvement comprising scrubbing said fluid successively with at least two aqueous solutions of said absorbent having progressively lower concentrations of absorbent, each solution having an initial ratio of said acidic impurities to absorbent not substantially higher than that of the preceding solution.

10. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, separating the fluid from the fat solution, regenerating the latter to drive off absorbed impurities and recirculating the regenerated solution containing residual acidic impurities for further scrubbing the fluid, the improvement comprising dividing the regenerated solution into two unequal portions, continuing regeneration of the smaller of said portions further to reduce its content of acidic impurities, diluting the resulting portion with water to produce a solution having a concentration of absorbent and a ratio of acidic impurities to absorbent lower than the larger portion, flowing said fluid through a scrubbing zone, introducing the more concentrated portion into said zone at an intermediate point and the diluted portion at a point near the end of the path of the fluid through said zone, flowing both portions in countercurrent to said fluid through the zone and combining the portions to form a single fat solution.

ERNEST W. ZUBLIN.